United States Patent
Nagata

[11] Patent Number: 5,231,162
[45] Date of Patent: Jul. 27, 1993

[54] POLYAMIC ACID HAVING THREE-DIMENSIONAL NETWORK MOLECULAR STRUCTURE, POLYIMIDE OBTAINED THEREFROM AND PROCESS FOR THE PREPARATION THEREOF

[75] Inventor: Yasuhisa Nagata, Shizuoka, Japan

[73] Assignee: Toho Rayon Co. Ltd., Tokyo, Japan

[21] Appl. No.: 840,111

[22] Filed: Feb. 24, 1992

Related U.S. Application Data

[63] Continuation-in-part of Ser. No. 586,103, Sep. 21, 1990, abandoned.

[30] Foreign Application Priority Data

Sep. 21, 1989 [JP] Japan .................. 1-245862
Sep. 21, 1989 [JP] Japan .................. 1-245863
Nov. 2, 1989 [JP] Japan .................. 1-286161

[51] Int. Cl.$^5$ .................. C08G 69/26; C08G 73/10
[52] U.S. Cl. .................. 528/353; 528/125;
528/126; 528/128; 528/170; 528/172; 528/173;
528/179; 528/183; 528/185; 528/187; 528/188;
528/220; 528/229; 528/342; 528/348; 528/351
[58] Field of Search .............. 528/353, 342, 348, 351,
528/125, 126, 172, 173, 128, 170, 183, 179, 188,
187, 220, 229; 428/473.5

[56] References Cited

U.S. PATENT DOCUMENTS

| | | | |
|---|---|---|---|
| 3,878,109 | 4/1975 | Ikeda .................. | 528/353 |
| 4,405,550 | 9/1983 | Hungerford .......... | 528/353 |
| 4,426,486 | 1/1984 | Hungerford .......... | 528/353 |
| 4,690,999 | 9/1987 | Numata ................ | 528/353 |

FOREIGN PATENT DOCUMENTS

0274603 7/1988 European Pat. Off.

OTHER PUBLICATIONS

CA 78 (22): 136764v.
CA 110 (10): 76332v.
CA 77 (2): 6483w.
CA 74 (10): 43070t.
CA 72 (10): 44495f.
CA 72 (10): 44352g.

*Primary Examiner*—John Kight, III
*Assistant Examiner*—P. Hampton-Hightower
*Attorney, Agent, or Firm*—Sughrue, Mion, Zinn, Macpeak & Seas

[57] ABSTRACT

A polyamic acid having a three-dimensional network molecular structure produced by a gel forming ring-opening polyaddition reaction in an organic solvent of the reaction components comprising:

(A) an acid component consisting of at least one tetracarboxylic acid dianhydride selected from the group consisting of a tetracarboxy benzene dianhydride, a tetracarboxy dianhydride of a compound having 2 to 5 condensed benzene rings, and compounds represented by formula (III), and substituted compounds thereof:

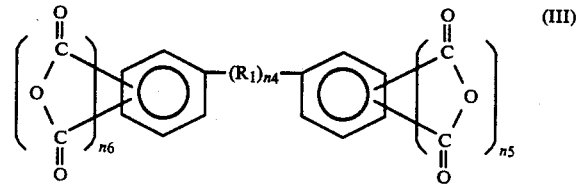

wherein $R_1$ represents —O—, —CO—, —SO$_2$—, —SO—, an alkylene group, an alkylene bicarbonyloxy group, an alkylene bioxycarbonyl group, a phenylene group, a phenylene alkylene group, or a phenylene dialkylene group, $n_4$ is 0 or 1, $n_5$ is 0 or 1; and $n_6$ is 1 or 2, provided that the sum of $n_5$ and $n_6$ is 2; and (2) 0 to 10 wt % of at least one acid component selected from the group consisting of a di- or tricarboxylic acid, a carboxylic acid anhydride and a substituted compound thereof;

(B) at least one aromatic diamine; and (C) at least one polyamino compound selected from the group consisting of compounds represented by formula (I) or (II):

(Abstract continued on next page.)

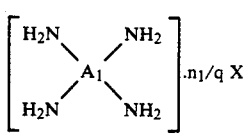 (I)

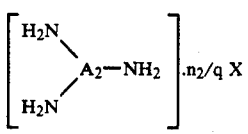 (II)

wherein $A_1$ represents

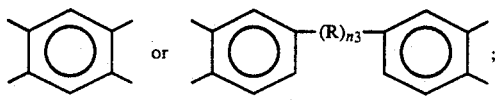

$A_2$ represents

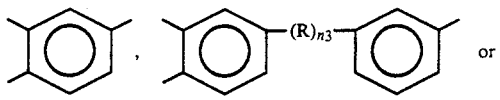 or

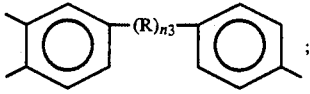;

$n_1$ is 0 or an integer from 1 to 4; $n_2$ is 0 or an integer from 1 to 3; X represents an acid; q represents the base number of the acid; R represents —O—, —$CH_2$—, —CO— or —$SO_2$—; and $n_3$ is 0 or 1; a polyimide derived from the polyamic acid; and a process for preparing a film of the polyamic acid or polyimide.

The polyimide film has superior heat resistance and mechanical characteristics.

35 Claims, No Drawings

POLYAMIC ACID HAVING THREE-DIMENSIONAL NETWORK MOLECULAR STRUCTURE, POLYIMIDE OBTAINED THEREFROM AND PROCESS FOR THE PREPARATION THEREOF

This is a continuation-in-part of application Ser. No. 07/586,103 filed Sep. 21, 1990 now abandoned.

FIELD OF THE INVENTION

The present invention relates to a polyamic acid which is a precursor of a polyimide resin known as a heat-resistant resin. More particularly, it relates to a novel polyamic acid having a three-dimensional network molecular structure capable of providing a gel. Furthermore, the present invention relates to the polyimide resin obtained from the polyamic acid. It also relates to processes for the preparation thereof and preparation of a film therefrom.

BACKGROUND OF THE INVENTION

Methods are known for obtaining polyimide resins by polycondensing a tetracarboxylic acid dianhydride with an aromatic diamine in an organic solvent to prepare a polyamic acid as a precursor of a polyimide resin, followed by the dehydration and cyclization thereof by a chemical dehydration reaction under heating or using a dehydrating agent.

Generally, the ring opening polycondensation reaction proceeds in an organic solvent in such an amount as to give a polyamic acid concentration of 5 to 20% by weight in the solution. The solvent is removed from the solution of the polyamic acid uniformly dissolved in the organic solvent to obtain a film or a molded article.

Polyimide resins are widely used in the fields of electrical and electronical materials, adhesives, coatings, composite materials, fibers and film materials, because they are excellent in heat resistance, wear resistance, chemical resistance, electrical insulating properties and mechanical characteristics.

Polyimide resin films are also used in various ways as coating materials for electric wires, cables and wires and as insulating materials for transformers and printed-wiring boards, because of their excellent characteristics.

Generally, polyimide films are prepared by a method wherein an organic solution of a polyamic acid is cast on a support and the dehydration-cyclization reaction of the polyamic acid is accelerated by a heat treatment or a chemical treatment to obtain a polyimide film.

Alternatively, after an organic solvent solution of a polyamic acid is cast on a support, the solvent is removed by drying or the cast polyamic acid together with the support is immersed in a coagulating bath to coagulate the polymer solution, whereby a film can be obtained. The thus-obtained film is sometimes called a gel film. However, this gel film is formed by entanglement of polymer chains and does not have a three-dimensional network molecular structure formed through chemical bonds, therefore it is different from a gel film which is obtained by the present invention, which has a three-dimensional network structure.

JP-A-57-109614 (the term "JP-A" as used herein means an "unexamined published Japanese patent application") proposes a method wherein an organic solvent solution of a dehydrating agent and a polyamic acid and an organic solvent solution of a catalyst and a polyamic acid and are simultaneously applied to a support. After a gel film (obtained by entanglement of polymer chains) of the polyamic acid is formed by drying, the gel film is heat treated to obtain a polyimide film.

In the production of polyimide films, films having high mechanical characteristics can be obtained depending on the combinations of tetracarboxylic acid dianhydrides and aromatic diamines to be polycondensed. A polyimide film obtained from the combination of pyromellitic anhydride with 4,4'-diaminodiphenyl ether is a typical film which has high heat resistance and is excellent in tensile properties.

However, when heat resistance becomes higher, the film generally is brittle, and hence heat resistance is balanced against mechanical characteristics. Particularly, polyimide obtained from a combination of pyromellitic dianhydride with p-phenylenediamine has poor film properties and is brittle and extremely inferior in mechanical characteristics, though it is among the best with regard to physical and chemical heat resistance.

In the polyimide of this type, the mechanical characteristics of the polyimide film can be improved by copolymerization techniques. To improve mechanical characteristics without reducing heat resistance, JP-A-63-254131 discloses a method wherein 4,4'-diaminodiphenyl ether as another component of the aromatic diamine is copolymerized in the production of polyimide by using a combination of pyromellitic dianhydride with p-phenylenediamine. However, a large amount of 4,4'-diaminodiphenyl ether must be added to improve film forming properties and as a result, a loss of heat resistance results.

As used herein, the term "free-standing gel" means that the gel is capable of retaining its shape without causing deformation at room temperature (25° C.). For example, when the gel is formed on a support as a film, the film is capable of retaining its shape without flowing even if the support is inclined.

SUMMARY OF THE INVENTION

A first object of the present invention is to provide polyamic acids having a three-dimensional network molecular structure.

A second object of the present invention is to provide a polyamic acid capable of repeatedly swelling and shrinking by absorption and desorption of an organic solvent, and capable in a swollen state of forming a free-standing gel.

A third object of the present invention is to provide a polyimide having three-dimensional network molecular structure from the polyamic acid.

A fourth object of the present invention is to provide a method for preparation of film from the polyamic acid and the polyimide.

A fifth object of the present invention is to provide a method for the preparation of a polyimide film mainly composed of a tetracarboxylic acid dianhydride and an aromatic diamine having excellent mechanical characteristics with good reproducibility and with excellent heat resistance.

It has now been found that these and other objects of the present invention are attained by a polyamic acid with a three-dimensional network molecular structure produced by gel forming ring-opening polyaddition reaction of;

(A) at least one tetracarboxylic acid dianhydride;
(B) at least one aromatic diamine; and
(C) at least one polyamino compound represented by formula (I) or (II):

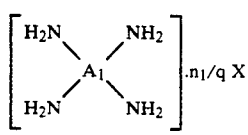

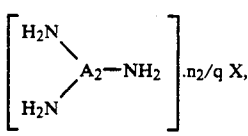

wherein $A_1$ represents

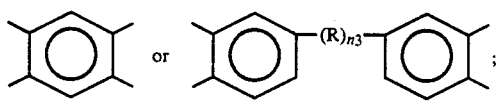

$A_2$ represents

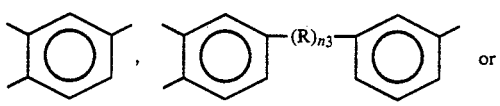

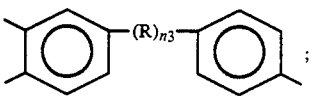

$n_1$ is 0 or an integer of 1 to 4; $n_2$ is 0 or an integer of 1 to 3; X represents an acid; q is the base number of the acid; R represents —O—, —CH$_2$—, —CO— or —SO$_2$—; and $n_3$ is 0 or 1; $A_1$ and $A_2$ may be substituted.

DETAILED DESCRIPTION OF THE INVENTION

Typical examples of the tetracarboxylic acid dianhydride used as component (A) in the present invention are a tetracarboxy benzene dianhydride, a tetracarboxy dianhydride of a compound having 2 to 5 condensed benzene rings, and compounds represented by formula (III), and substituted compounds thereof:

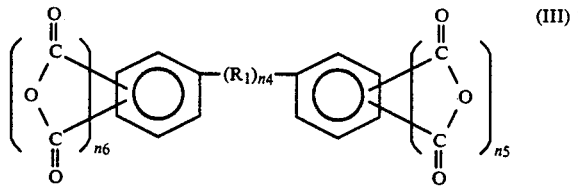

wherein $R_1$ represents —O—, —CO—, —SO$_2$—, —SO—, an alkylene group, an alkylene bicarbonyloxy group, an alkylene bioxycarbonyl group, a phenylene group, a phenylene alkylene group, or a phenylene dialkylene group; $n_4$ is 0 or 1; $n_5$ is 0 or 1; and $n_6$ represents 1 or 2, provided that the sum of $n_5$ and $n_6$ is 2.

Examples of tetracarboxylic acid dianhydrides include pyromellitic dianhydride, 3,3',4,4'-benzophenonetetracarboxylic acid dianhydride, 3,3',4,4'-biphenyltetracarboxylic acid dianhydride, 2,3,3',4'-biphenyltetracarboxylic acid dianhydride, 2,2',3,3'-biphenyltetracarboxylic acid dianhydride, 2,2',6,6'-biphenyltetracarboxylic acid dianhydride, 2,3,6,7-naphthalenetetracarboxylic acid dianhydride, 1,2,5,6-naphthalenetetracarboxylic acid dianhydride, 2,2-bis(3,4-dicarboxyphenyl)propane dianhydride, bis(3,4-dicarboxyphenyl) sulfone dianhydride, bis(3,4-dicarboxyphenyl)ether dianhydride, 3,4,9,10-perylenetetracarboxylic acid dianhydride, naphthalene-1,2,4,5-tetracarboxylic acid dianhydride, naphthalene-1,4,5,8-tetracarboxylic acid dianhydride, benzene-1,2,3,4-tetracarboxylic acid dianhydride and ethylene glycol bis(anhydrotrimellitate). These compounds may be used either alone or as a mixture of two or more of them.

Typical examples of the aromatic diamine used as component (B) are a phenylene diamine, a diamino pyridine, a diamino compound having 2 to 8 condensed benzene rings, compounds represented by formula (IV), and substituted compounds thereof:

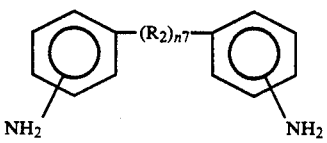

wherein $R_2$ represents —O—, —CO—, —SO$_2$—, —SO—, a phenylene group, an alkylene group, a phenylene alkylene group, a phenylene dialkylene group, or

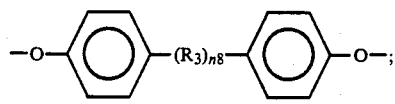

$n_7$ is 0 or 1; $R_3$ represents —O—, —CO—, —SO$_2$—, —SO—, a phenylene group, an alkylene group, or a phenylene alkylene group, a phenylene dialkylene group; and $n_8$ is 0 or 1.

Examples of the aromatic diamines include m-phenylenediamine, p-phenylenediamine, 4,4'-diaminodiphenylpropane, 4,4'-diaminodiphenylmethane, 3,3'-diaminodiphenylmethane, 4,4'-diaminodiphenyl sulfide, 4,4'-diaminodiphenyl sulfone, 3,3'-diaminodiphenyl sulfone, 3,4'-diaminodiphenyl sulfone, 4,4'-diaminodiphenyl ether, 3,3'-diaminodiphenyl ether, 3,4'-diaminodiphenyl ether, 4,4'-diaminobenzophenone, 3,3'-diaminobenzophenone, 2,2'-bis(4-aminophenyl)propane, benzidine, 3,3'-diaminobiphenyl, 2,6-diaminopyridine, 2,5-diaminopyridine, 3,4-diaminopyridine, bis[4-(4-aminophenoxy)phenyl] sulfone, bis[4-(3-aminophenoxy) phenyl] sulfone, bis[4-(4-aminophenoxy)phenyl] ether, bis[4-(3-aminophenoxy)phenyl] ether, 2,2'-bis[4-(4-aminophenoxy)phenyl] propane, 2,2'-bis[4-(3-aminophenoxy)phenyl]propane, 4,4'-bis(4-aminophenoxy) biphenyl, 1,4-bis(4-aminophenoxy) benzene, 1,3-bis(4-aminophenoxy) benzene, 2,2'-bis[4-(3-aminophenoxy)phenyl]-hexafluoropropane, 1,5-diaminonaphthalene, 2,6-diaminonaphthalene and derivatives thereof (i.e., substituted diamine having a substituent(s)).

The substituent for components (A), (B) and (C) should not adversely affect the condensation reaction and should not deteriorate characteristics of the products obtained therefrom. Examples of such substituents include an aliphatic group, a hydrogen atom, and a halogen atom.

The acid represented by X in formulae (I) and (II) may be either an organic or inorganic acid. Examples of the acid include p-toluenesulfuric acid, picric acid, and hydrochloric acid.

These compounds may be used either alone or as a mixture of two or more of them.

Typical examples of the polyamino compounds used as component (C) include 3,3',4,4'-tetraaminodiphenyl ether, 3,3',4,4'-tetraaminodiphenylmethane, 3,3',4,4'-tetraaminobenzophenone, 3,3',4,4'-tetraaminodiphenyl sulfone, 3,3',4,4'-tetraaminobiphenyl 1,2,4,5-tetraaminobenzene, 3,3'4-triaminodiphenyl, 3,3'4-triaminodiphenylmethane, 3,3',4-triaminobenzophenone, 3,3',4-triaminodiphenylsulfone, 3,3'4-triaminobiphenyl, and 1,2,4-triaminobenzene, and their mono-, di-, tri- or tetra- acid salts such as 3,3',4,4'-tetraaminodiphenyl ether tetrahydrochloride, 3,3',4,4'-tetraaminodiphenylmethane tetrahydrochloride, 3,3',4,4'-tetraaminobenzophenone tetrahydrochloride, 3,3',4,4'-tetraaminodiphenyl sulfone tetrahydrochloride, 3,3',4,4'-tetraaminobiphenyl tetrahydrochloride, 1,2,4,5-tetraaminobenzene tetrahydrochloride, 3,3'4-triaminodiphenyl trihydrochloride, 3,3'4-triaminodiphenylmethane trihydrochloride, 3,3',4-triaminobenzophenone trihydrochloride, 3,3',4-triaminodiphenylsulfone trihydrochloride, 3,3'4-triaminobiphenyl trihydrochloride, and 1,2,4-triaminobenzene dihydrochloride. The above compounds usually exist in the form of hydrated compounds. These compounds may be used either alone or as a mixture of two or more of them.

When the above-described tetraamino compounds and triamino compounds which are not in the form of an addition salt are used, the time taken for gelation is considerably reduced and hence it is preferred to use them together with the above-described addition salts, especially when film is prepared from the polyamic acid. The amount of the addition salts is preferably 50 to 100 mol % by weight, more preferably 75 to 100 mol % based on the total mol of the polyamino compounds.

Since each of these components (A), (B) and (C) may be used as a mixture of two or more, the resulting polymers include copolymers. Furthermore, a polyamic acid gel may be obtained by mixing a first solution of a polyamic acid (prior to gelation) containing the specific components (A), (B) and (C) with a second solution of a polyamic acid (prior to gelation) wherein at least one of the aforesaid components (A), (B) and (C) is different from the above first solution, and then proceeding gelation.

The polyamic acid of the present invention can be obtained by reacting the components (A), (B) and (C) in an organic solvent generally at a temperature of $-10°$ to 80° C., preferably $-5°$ to 50° C., more preferably 0° to 30° C., in an inert atmosphere. The reaction time is not longer than 10 hours, preferably not longer than 5 hours, more preferably not longer than 2 hours. When the reaction time exceeds 10 hours, a hydrolysis reaction often occurs. Usually, the reaction time is at least 5 minutes.

It is necessary that the organic solvent used for the reaction be inert to the reaction and capable of dissolving the components (A), (B) and (C) to be reacted. Typical examples of the organic solvent include N,N-dimethylformamide, N,N-dimethylacetamide, N,N-diethylformamide, N,N-diethylacetamide, dimethyl sulfoxide, N-methyl-2-pyrrolidone, N,N-dimethylmethoxyacetamide, hexamethylphosphoamide, pyridine, dimethyl sulfone, tetramethylene sulfone, phenols such as cresol, phenol and xylenol, benzene, toluene, xylene, benzonitrile, dioxane and cyclohexane. These solvents may be used either alone or as a mixture of two or more of them.

The molar ratio of component (A) to component (B) to component (C) (hereinafter referred to as (A)/(B)/(C)) to be reacted preferably is in the range of 100:60-100:1-20 (hereinafter referred to as 100/(60-100)/(1-20)), more preferably 100/(60-100)/(2-20), most preferably 100/(70-100)/(4-15).

Generally, it is preferred that when the polyamic acid is prepared from the tetracarboxylic acid dianhydride and the aromatic diamine, both components are reacted in an equimolar ratio as much as possible to increase molecular weight. Therefore it is preferable that the molar ratio of (A)/(B) is kept in the range of 100/(60-100), more preferably 100/(70-100), and the molar ratio of A)/(B)/(C) is kept in the range of 100/(60-100)/(1-20), more preferably 100/(60-100)/(2-20), most preferably 100/(70-100)/(4-15) to increase the degree of polymerization. Furthermore, the components A), B) and (C) preferably are used in proportions such that the difference of the molar number of the reactive groups of the tetracarboxylic acid dianhydride and those of the amines is adjusted to a value within ±5%. That is, a preferred equivalent ratio of reactants is as follows:

$$0.95 < \frac{\text{equivalent of carboxylic anhydride}}{\text{equivalent of amine}} < 1.05$$

Therefore, when a tetraamino compound is used as component (C) the following relationship should be satisfied: $0.95 \times [\text{moles of (B)} + 2 \times \text{moles of (C)}] < \text{moles of (A)} < 1.05 \times [\text{moles of (B)} + 2 \times \text{moles of (C)}]$ When the molar ratio of (A)/(B) is not within the range of 100/(60-100), the degree of polymerization is not sufficient and the resulting three-dimensional molecular structure is imperfect. When the molar ratio of (C)/(A) is lower than 1/100, the formation of the three-dimensional network structure is insufficient, that is, gelation tends not to be caused.

When the molar ratio of (C)/(A) is higher than 20/100, the reaction proceeds rapidly, the resulting gel is suspended as small pieces in the solvent and a uniform product is difficult to obtain. Accordingly, the molar ratio of (C)/(A) preferably should be in the range of (1-20)/100.

The reaction of the components (A), (B) and (C) is a polymerization reaction of the carboxylic anhydride and amino compounds takes place. In the present invention at least three amino groups of component (C) should participate in the polymerization reaction to form three-dimensional network molecular structure. The component (A) may be gradually added to a solution of the components (B) and (C) dissolved in an organic solvent, in an inert atmosphere such as nitrogen gas. In such a case the molar ratio of the amount of the component (A) to the total amount of components (B) and (C) is preferably higher than 1. The component (A) may be added in the form of a solid or a solution thereof in a solvent. Alternatively, the components (B) and (C) may be added to a solution of the component (A) dissolved in an organic solvent. In such a case the molar ratio of the amount of the component (A) to the total amount of components, (B) and (C) is preferably not higher than 1. If desired, the component (C) may be added during the course of the reaction of the component (A) with the component (B). However, it should be noted that when the component (B) is added to a reaction system where the predetermined amounts of the components (A) and (C) are reacted, there is a possibility that the reaction will not proceed sufficiently and that gelation may not occur depending on preparation conditions.

It is preferred from the viewpoint of handling that the amount of the organic solvent used during the reaction be controlled so that the polyamic acid gel contains 3 to 50% by weight, preferably 5 to 30% by weight, and more preferably 10 to 20% of the resulting polyamic acid. Those percentages correspond to the concentration of the total concentration of components (A), (B) and (C). When the concentration of the polyamic acid in the gel is lower than 3% by weight, the resulting gel is poorly free-standing, while when the concentration exceeds 50% by weight, the contents of components (A), (B) and (C) is too high, the viscosity of the solution is increased during the course of the polymerization and the polymerization reaction does not proceed as expected. When gelation does not occur in a lower concentration of the components, the concentration should be increased to accelarate the three dimensional reaction to form gel. The concentration can be easily controlled by repeating simple experiments.

The molecular weight of the polyamic acid is preferably 10,000 to 300,000, more preferably 30,000 to 300,000.

The degree of the network molecular structure can be increased by heating (usually 50° to 80° C.), subjecting to light (such as ultraviolet ray) or by applying pressure (usually up to 3.0 kg/cm$^2$).

In addition to the components (A), (B) and (C), the reaction mixture may contain small amounts (usually up to 10 wt % based on the component (A)) of a di- or tricarboxylic acid such as trimellitic acid, a carboxylic acid anhydride or a substituted compound thereof.

The three-dimensional structure of the polyamic acid containing about 50 to 97% (based on the total weight of the polyamic acid and the solvent) by weight of the above-described organic solvent is a free-standing gel.

The content of the solvent in the three-dimensional structural product of the novel polyamic acid obtained by the present invention can be controlled by swelling or shrinkage by the absorption or desorption of the solvent. Deswelling can be conducted by heating preferably at up to 80° C. under reduced pressure or by solvent replacement. The number of linkages in the chemical structure of the gel can be increased by external excitement such as temperature, light and pressure. The polyamic acid of the present invention which has a three-dimensional network structure is useful in functional high-molecular materials such as a material separating membrane, or a chemical switch using the swelling-shrinking (deswelling) function.

The polyimide resin can be obtained by subjecting the polyamic acid to a conventional dehydration and cyclization reaction. For example, imidation can be completed by a high-temperature treatment or a chemical dehydrating treatment using a dehydrating agent.

When the polyamic acid is in a gel state, the gel is preferably heated at 30° to 80° C. for 0.5 to 10 hours, more preferably at 30° to 50° C. for 1 to 5 hours. Usually, the temperature is gradually elevated in order to maintain the form of the polyamic acid (usually it is film). When the polyamic acid is in a deswollen state heating is usually conducted at 150° to 500° C. for 10 seconds to 10 hours, preferably at 200° to 400° C. for 1 to 5 hours.

The imidation can be confirmed by observing infrared spectral absorption at 1780 cm$^{-1}$ and 1720 cm$^{-1}$.

The imidation of the polyamic acid can be conducted while retaining the polyamic acid in gel state, for example, by a method wherein dehydration and cyclization are chemically carried out by impregnating the polyamic acid with a solution of a dehydrating agent. Alternatively, the gel may be subjected to a chemical treatment after the solvent is removed from the gel or the solvent is replaced with a poor solvent.

It is effective to use acid anhydrides as dehydrating agents in the presence of amines as catalysts in the chemical dehydration reaction. Examples of the acid anhydrides include aliphatic acid anhydrides such as acetic anhydride, propionic anhydride and butyric anhydride and benzoic anhydride. These compounds may be used either alone or as a mixture of two or more of them.

Examples of the amines which can be used as catalysts include tert-amines such as trimethylamine, triethylamine, triethylenediamine, hexamethylenetetraamine, tributylamine, dimethyl-aniline, pyridine, α-picoline, β-picoline, γ-picoline, isoquinoline and lutidine. At least one amine selected from the group consisting of tert-amines is used as a catalyst.

The amount of the acid anhydride to be added in the chemical dehydration reaction is preferably 1 to 5 equivalents, more preferably 1 to 3 equivalents per equivalent of carboxyl group present in the polyamic acid. The amount of the catalyst is preferably 0.01 to 1.5 equivalents, more preferably 0.2 to 1 equivalent per equivalent of carboxyl group present in the polyamic acid.

The acid anhydride and the amine are dissolved to an organic solvent for these compounds to form a solution used for the dehydration reaction. Examples of solvents include the above-described solvents for components (A), (B) and (C). The concentration of the acid anhydride is usually 1 to 10% by weight.

The chemical treatment for imidation is preferably conducted at 0° to 80° C. for 0.5 to 48 hours.

A polyimide resin having a specific molecular stereostructure can be prepared by subjecting the polyamic acid to the above-described dehydrating-cylization reaction. A polyimide gel having a three-dimensional network molecular structure can be obtained when the imidation is conducted using the polyamic acid gel. A polyimide gel containing the above-described organic solvent in an amount depending on preparation conditions can be obtained.

The state of the three-dimensional network structure of the novel polyimide resin obtained by the present invention can be changed by swelling or shrinking by absorption or desorption of the solvent.

The resulting polyimide resin has excellent heat resistance and hence the resulting polyimide resin is useful as a functional high-molecular material having a material separating ability, an excitation response effect or a catalytic effect.

The process for the preparation of polyimide film includes the steps of casting or coating an organic solvent solution of the polyamic acid of the present invention on a support to prepare a gel film of the polyamic acid which gives a free-standing three-dimensional network structure, and subjecting it to a dehydration-cyclization reaction after peeling or without peeling the film from the support. Examples of support material include glass, metals, ceramics, and polymer resins such as a polyester resin.

Typical examples of the tetracarboxylic acid dianhydride preferably used as the component (A) for preparation of the polyimide film in the present invention include pyromellitic dianhydride, benzophenonetetracarboxylic acid dianhydride or biphenyltetracarboxylic acid dianhydride alone or a mixture of two or more thereof as the tetracarboxylic acid dianhydride. They are preferred because a polyimide film having high heat resistance and excellent mechanical characteristics (e.g., tensile strength) can be obtained.

Typical examples of the aromatic diamine preferably used as the component (B) for preparation the polyimide film of the present invention include p-phenylenediamine, m-phenylenediamine and 4,4-diaminodiphenyl ether alone or a mixture of two or more thereof. They are preferred because a polyimide film having high heat resistance and excellent mechanical characteristics can be obtained.

When the reaction temperature of components (A), (B) and (C) is lower than $-10°$ C., there is difficulty in handling the reaction system and further, there is a possibility that the reaction temperature itself is too low for the reaction to proceed sufficiently. When the reaction temperature is higher than 80° C., the reaction proceeds too rapidly until gelation is caused, and there is a possibility that gelation will occur before film formation, and a uniform film cannot be obtained. Accordingly, when a film is prepared from a solution of a polyamic acid obtained by polyaddition of the component (A) with the components (B) and (C), it is preferred that the solution of the polyamic acid and a substrate for use in the preparation of the film are controlled to a temperature of from 0° to $+30°$ C. prior to the preparation of the film and then the solution of the polyamic acid is cast or coated on a support to prepare the film.

When the components are blended in a composition outside the range defined above, for example, in proportions such that (moles of A)$<0.95\times$[(moles of B)$+2\times$(moles of C of formula (I))], and reacted, the molecular weight of polymer is low and the properties such as mechanical properties of the resulting polymer film are remarkably poor. On the other hand, when the proportions are such that (moles of A)$>1.05\times$[(moles of B)$+2\times$(moles of C)], unreacted monomers are left in the polymer solution and the characteristics of the film obtained by the evaporation and drying of the polymer solution are adversely affected. For example, the thermal properties and hygroscopic properties of the finally obtained polyimide film may be lowered.

When the molar ratio of (C)/(A) is higher than 20/100, the crosslinking points of the three-dimensional network structure are increased, the film properties of the gel structure are adversely affected, and the film is apt to be brittle. Accordingly, the molar ratio of (C)/(A) is preferably in the range of (2 to 20)/100.

Further, when the ratio of (C)/(A) is increased, the heat resistance of the polyimide resin obtained by the dehydration and cyclization reaction tends to be lower and hence the molar ratio of (C)/(A) is more preferably at most 15/100.

In the film of the polyamic acid prepared from the components (A), (B) and (C) of the present invention, gelation is caused after the solution of the polyamic acid is cast on a support, whereby a gel film of the polyamic acid is obtained. The gel film is free-standing when it contains about 50 to 97% by weight of the organic solvent based on the total amount of the gel film. It is preferred that when a polyimide film is prepared from the gel film of the polyamic acid as a precursor, the solvent is removed at a temperature of not higher than 80° C. under atmospheric pressure or vacuum to adjust the solvent content of the gel film 0 to 50% by weight, preferably not higher than 40% by weight, and the resulting film is subjected to a dehydration and cyclization reaction to give a polyimide film. According to this method, there can be obtained a film with remarkably few defects that is excellent in physical properties (such as tensile strength).

Further, a polyimide film can be obtained in the following manner. The gel film of the polyamic acid which contains the solvent is immersed in a coagulating bath comprising a poor solvent for the polyamic acid, whereby the organic solvent left in the film is removed by the substitution of the solvent or the washing of the film is carried out. Thereafter, the film is peeled off from the support and treated at a high temperature or chemically treated to obtain a polyimide film. In this operation, water is generally used as a coagulating liquid. Alcohols such as methanol and ethanol may be used with water in an amount of not more than 50% by weight based on the total amount of the coagulating liquid. Further, ketones such as acetone, amide solvents such as N,N-dimethylacetamide and chlorine-containing solvents such as 1,2-di-chloroethane may be used in an amount of not more than 20% by weight based on the total amount of the coagulating liquid. When the above-described washing of the film is intensified, impurities such as chlorine contained in the film can be removed.

As a method for allowing imidation while retaining the three-dimensional network molecular structure, imidation can be conducted in a manner similar to those used for conventional polyimide resins.

For example, when imidation is to be completed by a high-temperature treatment, the free-standing gel film of the polyamic acid is dried until the amount of the solvent is reduced to 0 to 10% by weight at a temperature of 50° to 200° C. for at least 10 seconds and further heat-treated at an elevated temperature of 150° to 500° C., preferably 200° to 450° C. When the above treatment is carried out while fixing both ends in the longer length direction of the film by means of a fixing frame, a fastener or a pin guide, a film excellent in dimensional stability and mechanical characteristics can be obtained. This method is very effective, because the gel film of the polyamic acid is greatly shrunk by drying or heat treatment in particular.

Further, a method can be used wherein the three-dimensional network structural gel film of the polyamic acid is immersed in a solution of a dehydrating agent or a solution of a dehydrating agent is applied by penetrating in the gel film by coating or spraying onto the gel film as described hereinbefore for imidation processing, to perform chemical dehydration and cyclization.

The polyimide film obtained from the gel film of the novel polyamic acid of the present invention has a three-dimensional network molecular structure. Hence, the mechanical characteristics of the film itself are improved and excellent heat resistance and mechanical strength with toughness are imparted to the film.

According to the present invention a uniform polyimide film can be formed from the polyamic acid gel.

A polyimide film having a specific performance can be prepared by the mechanical treatment such as orientation of the film or the preparation of a coagulated porous film by the substitution of the solvent in a coagulating bath.

In particular polyimides having high heat resistance (a) a combination of one or more of pyromellitic dianhydride, benzophenonetetracarboxylic acid dianhydride and biphenyltetracarboxylic acid dianhydride as the tetracarboxylic acid dianhydride component, (b) one or more members of p-phenylenediamine, m-phenylenediamine and 4,4'-diaminodiphenyl ether as the aromatic diamine component and (c) component (C). The improvement of film due to the formation of the three-dimensional molecular structure of the polyamic acid by the addition of the component (C) is remarkable.

Since the film thus obtained has a specific molecular structure, the state of the film structure can be changed by swelling or shrinkage (by penetration of the solvent or deswelling), or by changing the number of linkage in the molecular structure by external excitement such as temperature, light or pressure. Further, the film has excellent heat resistance and the film is useful as a functional high-molecular material having a material separating ability, an excitation response effect or a catalytic effect.

Various additives, for example, metallic compounds, low-molecular organic compounds (other than the solvent), high-molecular compounds (for example, a polyamic acid derived from components (A) and (B) and plyimide derived from components (A) and (B), inorganic fillers, coloring materials, and/or reinforcing fiber may be present in the three-dimensional molecular network structure of the polyamic acid or polyimide of the present invention.

Polyamic acids or polyimides of the present invention having different components (A), (B) and (C) or different amounts of each of components may be used as a mixture. The polyamic acids may also be mixed with the polyamide.

The invention is now illustrated in greater detail with reference to the following specific examples, but the present invention is not to be construed as being limited thereto. Unless otherwise indicated, all parts, percents and ratios are by weight.

In order to determine heat resistance of the polymer obtained in Examples, the temperature of 5% by weight reduction was measured by thermogravimetric analysis (in a nitrogen atmosphere at a heating rate of 10° C./min.)

EXAMPLE 1

In a 500 ml four-necked separable flask, there were placed 0.038 mol (7.608 g) of purified 4,4'-diaminodiphenyl ether (component B, abbreviated to 4,4'-DPE) and 0.001 mol (0.214 g) of 3,3',4,4'-tetraaminobiphenyl (component C, abbreviated to TAB). To the flask was then added 115 g of distilled N,N-dimethylacetamide (solvent, abbreviated to DMAc). The mixture was stirred to dissolve them.

The temperature of an external water bath was controlled to 15° C. in a nitrogen atmosphere. While stirring the solution obtained above, 0.04 mol (8.732 g) of purified anhydrous pyromellitic dianhydride (component A, abbreviated to PMOA) in the form of a solid was gradually added thereto with care so that the temperature of the solution was not raised.

With the completion of the addition of all of PMDA, stirring was stopped and the solution was left to stand for 2 hours at 30° C. The resulting product was a gel-form polymer, exhibiting N-H absorption of amic acid at 3280 cm$^{-1}$ by infrared absorption analysis. The gel-form polymer was treated at 150° C. for one hour, 200° C. for one hour, at 300° C. for one hour and at 370° C. for one hour. Absorption bands specific to an imide group were observed at 1780 cm$^{-1}$ and 1720 cm$^{-1}$. Hence, it was confirmed that the polymer was a polyamic acid which was a precursor of a polyimide.

In order to determine the heat resistance of the resin the temperature of the resin was raised until the polyimide decomposed.

The temperature at which 5% weight reduction of the polyimide obtained by the heat treatment occurred was 550° C.

In Table 1 below, the blending ratios of monomers used in the reaction are indicated by molar ratios.

COMPARATIVE EXAMPLE 1

In this Comparative Example Component (C) was omitted from the composition of the present invention to obtain a conventional polyamic acid.

In a 500 ml four-necked separable flask, there was placed 0.04 mol (8.008 g) of purified 4,4'-DPE. To the flask was then added 115 g of distilled DMAc and the mixture was stirred to dissolve it.

Thereafter, a polyamic acid was prepared in the same manner as in Example 1. The state of the resulting polymer was observed. The resulting polymer was not gelled, but was a viscous liquid. The intrinsic viscosity thereof was 1.2 dl/g, at 25° C.

EXAMPLES 2 TO 9 AND COMPARATIVE EXAMPLES 2 AND 3

In these Comparative Examples the molar ratios of the components were outside the range described hereinabove.

Into a 500 ml four-necked separable flask, there were charged monomers and solvents indicated in Table 1 in amounts given in Table 1. In the same manner as in Example 1, polyamic acids were prepared. The states of the polyamic acids were observed. In Examples 2 to 9, gel-form polymers were obtained, and it was confirmed that the polymers were gel-form polyamic acids by infrared absorption spectrum.

TABLE 1

|  | Example |  |  |  |  |  |  |  |  | Comparative Example |  |  |
|---|---|---|---|---|---|---|---|---|---|---|---|---|
|  | 1 | 2 | 3 | 4 | 5 | 6 | 7 | 8 | 9 | 1 | 2 | 3 |
| Component A |  |  |  |  |  |  |  |  |  |  |  |  |
| PMDA | 100 | 100 | — | — | — | 20 | 100 | — | 100 | 100 | 100 | 100 |
| BTDA | — | — | 100 | — | — | — | — | — | — | — | — | — |
| DSTA | — | — | — | — | — | — | — | 100 | — | — | — | — |
| BPDA | — | — | — | 100 | — | 80 | — | — | — | — | — | — |
| TMEG | — | — | — | — | 100 | — | — | — | — | — | — | — |

TABLE 1-continued

| | Example | | | | | | | | | Comparative Example | | |
|---|---|---|---|---|---|---|---|---|---|---|---|---|
| | 1 | 2 | 3 | 4 | 5 | 6 | 7 | 8 | 9 | 1 | 2 | 3 |
| Component B | | | | | | | | | | | | |
| PPD | — | 90 | — | — | — | — | — | — | — | — | — | — |
| 4,4'-DPE | 95 | — | — | — | — | 94 | 70 | — | 76 | 100 | 97 | 70 |
| BAPP | — | — | 95 | 45 | — | — | — | — | — | — | — | — |
| BAPS | — | — | — | — | — | — | — | 90 | — | — | — | — |
| BAPB | — | — | — | 45 | — | — | — | — | — | — | — | — |
| TPE-R | — | — | — | — | 82 | — | — | — | — | — | — | — |
| TPE-Q | — | — | — | — | — | — | 26 | — | — | — | — | — |
| Component C | | | | | | | | | | | | |
| TAB | 2.5 | 5.0 | 3.0 | — | — | 3.0 | 1.0 | 5.0 | 12 | — | 1.5 | 3.0 |
| TADE | — | — | — | 2.5 | — | — | 1.0 | — | — | — | — | — |
| TADM | — | — | — | — | 8.5 | — | — | — | — | — | — | — |
| Solvent | DMAc | DMAc | DMAc | DMF | DMSO | DMAc | DMAc | NMP | DMAc | DMAc | DMAc | DMAc |
| Concentration of Components (A), (B) and (C) (%) | 12.0 | 10.5 | 11.3 | 13.0 | 10.0 | 11.5 | 11.6 | 9.5 | 10.3 | 12.7 | 8.0 | 11.8 |
| Physical Properties State of Gelation | ○ | ○ | ○ | ○ | ○ | ○ | ○ | ○ | ○ | X | X | X |

Note:
The values in the Table represent molar ratios and thus differ from the value with regard to moles used in the experiments of the Examples and Comparative Examples.
*State of Gelation: The mark ○ means that a free-standing gel was formed.
The mark X means that a gel was not formed or gel was imperfect.
*Solvent DMAc: N,N-dimethylacetamide
NMP: N-methyl-2-pyrrolidone
DMF: N,N-dimethylformamide
DMSO: dimethyl sulfoxide
*When the concentration of components (A), (B) and (C) in Comparative Example 2 was increased to 12% a free-standing gel was formed

TABLE 2

| Classification | Abbreviation | Name | Chemical structural formula | Mol. wt. |
|---|---|---|---|---|
| Tetracarboxylic acid dianhydride (Component A) | PMDA | Pyromellitic dianhydride | 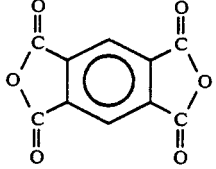 | 218 |
| | BTDA | 3,3',4,4'-benzophenone-tetracarboxylic acid dianhydride | 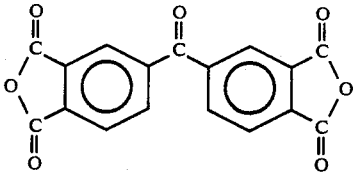 | 322 |
| | DSTA | diphenylsulfone-3,3',4,4'-tetracarboxylic acid dianhydride | 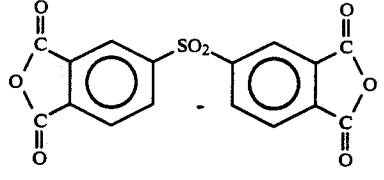 | 358 |
| Tetracarboxylic acid dianhydride (Component A) | BPDA | 3,3',4,4'-biphenyl-tetracarboxylic acid dianhydride | 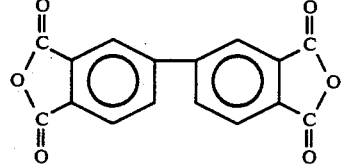 | 294 |
| | TMEG | ethylene glycol bis(anhydrotrimellitate) | 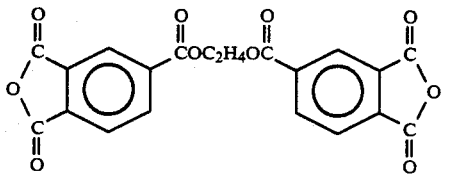 | 410 |

TABLE 2-continued

| Classification | Abbreviation | Name | Chemical structural formula | Mol. wt. |
|---|---|---|---|---|
| Aromatic diamine (Component B) | PPD | p-phenylenediamine | H₂N—⟨○⟩—NH₂ | 108 |
| | 4,4-DPE | 4,4'-diaminodiphenyl ether | H₂N—⟨○⟩—O—⟨○⟩—NH₂ | 200 |
| | BAPP | 2,2-bis[4-(4-aminophenoxy)phenyl]propane | H₂N—⟨○⟩—O—⟨○⟩—C(CH₃)₂—⟨○⟩—O—⟨○⟩—NH₂ | 410 |
| | BAPS | 2,2-bis[4-(4-aminophenoxy)phenyl]sulfone | H₂N—⟨○⟩—O—⟨○⟩—SO₂—⟨○⟩—O—⟨○⟩—NH₂ | 432 |
| Aromatic diamine (Component B) | BAPB | 4,4-bis(4-aminophenoxy)biphenyl | H₂N—⟨○⟩—O—⟨○⟩—⟨○⟩—O—⟨○⟩—NH₂ | 368 |
| | TPE-R | 1,3-bis(4-aminophenoxy)benzene | H₂N—⟨○⟩—O—⟨○⟩—O—⟨○⟩—NH₂ (meta) | 292 |
| | TPE-Q | 1,4-bis(4-aminophenoxy)benzene | H₂N—⟨○⟩—O—⟨○⟩—O—⟨○⟩—NH₂ | 292 |
| Tetraamine (Component C) | TAB | 3,3',4,4'-tetraaminobiphenyl | H₂N,H₂N—⟨○⟩—⟨○⟩—NH₂,NH₂ | 214 |
| | TADE | 3,3',4,4'-tetraaminodiphenyl ether | H₂N,H₂N—⟨○⟩—O—⟨○⟩—NH₂,NH₂ | 230 |
| | TADM | 3,3',4,4'-tetraaminodiphenylmethane | H₂N,H₂N—⟨○⟩—CH₂—⟨○⟩—NH₂,NH₂ | 219 |

EXAMPLE 10

The preparation of the polyamic acid was conducted by using a 500 ml four-necked separable flask and the same monomer composition and reaction conditions as those in Example 1. Before the polymer was gelled, the solution was cast on a glass plate in an amount of 460 g/m² to prepare a gel film of the polyamic acid.

The resulting gel film of the polyamic acid was immersed in a solution containing 240 ml of DMAc, 24.2 g of acetic anhydride and 6.3 g of pyridine and treated at room temperature for 24 hours while fixing the gel film so as to avoid warping or deformation. The imidation of the polyamic acid was thus performed, and the agar-agar-form gel was changed to a rigid gel containing the solvent.

It was confirmed that the three-dimensional molecular structure of the rigid polyimide resin was could be repeatedly swollen and shrunk by the penetration of the solvent (which can be used for preparation of the polyamic acid according on the present invention) and deswelling.

After the solvent was removed (to about 6 wt %) from the three-dimensional structure of the polyimide resin, heat treatment was carried out under the same conditions as those of Example 1. The temperature of 5 wt % weight reduction of the resulting film analyzed by thermogravimetric analysis was 550° C.

An infrared absorption spectrum analysis of the three-dimensional structure of the polyimide resin was made. There were found absorption bands specific to imide group at 1780 cm$^{-1}$ and 1720 cm$^{-1}$. Thus, it was confirmed that the imidation was completed.

COMPARATIVE EXAMPLE 4

In this comparative example, the molar ratio of components being outside the range described hereinabove.

In a 500 ml four-necked separable flask, there were placed 0.039 mol (7.80 g) of purified 4,4'-DPE and 0.0005 mol (0.107 g) of TAB. To the flask was then added 192 g of distilled DMAc. The mixture was stirred to dissolve them.

Subsequently, the preparation of the polyamic acid was carried out in the same manner as in Example 1. The resulting polymer was not gelled, but was a viscous liquid. The intrinsic viscosity thereof was 1.58 dl/g at 30° C.

The polymer was heat-treated in the same manner as in Example 1. The temperature of 5 wt % weight reduction of the resulting film analyzed by thermogravimetric analysis was 560° C.

EXAMPLES 11 TO 17, COMPARATIVE EXAMPLES 5 AND 6

In Comparative Example 5, Component (C) was omitted, and in Comparative Examples 6, the molar ratios of components were outside the range described hereinabove.

Into a 500 ml four-necked separable flask, there were charged monomers and solvents indicated in Table 3 in amounts given in Table 3. In the same manner as in Example 1, polyamic acids were prepared. Polymers which were gelled were subjected to a chemical dehydration reaction in the same manner as in Example 2 to prepare the three-dimensional molecular structure of polyimide resins. After the preparation of the resins, it was conformed that the polymers were converted into the polyimide resin by infrared absorption spectrum.

In Examples 11 to 17, the three-dimensional molecular structures of polyimide resins were prepared from gel-form polyamic acids. The temperature of 5 wt % weight reduction of each resin was measured. The results are shown in Table 5.

TABLE 3

|  | Example |  |  |  |  |  |  |  | Comparative Example |  |  |
|---|---|---|---|---|---|---|---|---|---|---|---|
|  | 10 | 11 | 12 | 13 | 14 | 15 | 16 | 17 | 4 | 5 | 6 |
| Component A |  |  |  |  |  |  |  |  |  |  |  |
| PMDA | 100 | — | — | 95 | 20 | 100 | — | 100 | 100 | 100 | 100 |
| BTDA | — | 100 | — | — | — | — | — | — | — | — | — |
| DSTA | — | — | — | — | — | — | 100 | — | — | — | — |
| BPDA | — | — | 100 | — | 80 | — | — | — | — | — | — |
| TMEG | — | — | — | 5 | — | — | — | — | — | — | — |
| Component B |  |  |  |  |  |  |  |  |  |  |  |
| PPD | — | — | — | — | — | 30 | — | — | — | — | — |
| 4,4'-DPE | 95 | — | — | — | 94 | 65 | — | 76 | 97.5 | 100 | 70 |
| BAPP | — | 95 | 45 | — | — | — | — | — | — | — | — |
| BAPS | — | — | — | — | — | — | 80 | — | — | — | — |
| BAPB | — | — | 45 | — | — | — | — | — | — | — | — |
| TPE-R | — | — | — | 82 | — | — | — | — | — | — | — |
| TPE-Q | — | — | — | — | — | — | 10 | — | — | — | — |
| Component C |  |  |  |  |  |  |  |  |  |  |  |
| TAB | 2.5 | 3.0 | — | — | 3.0 | 1.0 | 5.0 | 12 | 1.25 | — | 3.0 |
| TADE | — | — | 2.5 | — | — | 1.0 | — | — | — | — | — |
| TADM | — | — | — | 8.5 | — | — | — | — | — | — | — |
| Solvent | DMAc | DMF | DMF | DMSO | DMAc | DMAc | NMP | DMAc | DMAc | DMAc | DMAc |
| Concentration of Components (A), (B) and (C) | 12.0 | 11.5 | 11.7 | 10.3 | 12.5 | 13.2 | 12.0 | 10.0 | 8.0 | 12.0 | 12.5 |
| Physical Properties |  |  |  |  |  |  |  |  |  |  |  |
| State of Gelation | ○ | ○ | ○ | ○ | ○ | ○ | ○ | ○ | X | X | X |
| Temperature of 5 wt % weight reduction | 550 | 520 | 540 | 530 | 550 | 570 | 510 | — | 560 | 570 | — |

Note:
The values in the Table represent molar ratios, thus differing from the values with regard to moles used in the experiments of the Examples and Comparative Examples.
*State of Gelation: The mark ○ means that a free-standing gel was formed.
The mark X means that a gel was not formed or the gel was imperfect.
*Solvent DMAc: N,N-dimethylacetamide
NMP: N-methyl-2-pyrrolidone
DMF: N,N-dimethylformamide
DMSO: dimethyl sulfoxide

EXAMPLE 18

In a 300 ml four-necked separable flask, there were placed 0.0168 mol (1.816 g) of purified p-phenylenediamine (abbreviated to PPD) and 0.0016 mol (0.6336 g) of 3,3',4,4'-tetraaminobiphenyl tetrahydrochloride dihydrate (abbreviated to TABT). To the flask was then added 50 g of distilled N,N-dimethylacetamide (abbreviated to DMAc). The mixture was stirred to dissolve them.

The temperature of an external water bath was controlled to 5° C., and in a nitrogen atmosphere, while stirring the solution obtained above, 0.02 mol (4.366 g) of purified anhydrous pyromellitic dianhydride (abbreviated to PMDA) in the form of a solid was gradually added thereto with care so that the temperature of the solution was not raised.

After all of PMDA was added, stirring was continued for 20 minutes. The uniform solution of a polyamic acid obtained was cast on a glass sheet. The coating amount of the solution was controlled by a spacer to 460 g/m$^2$. On standing for 60 minutes, the cast polymer solution was gelled and a gel film of the polyamic acid was obtained.

The resulting gel film of the polyamic acid was in the form of agar-agar and free-standing.

The gel film of the polyamic acid was dried at 30° C. under vacuum to adjust the content of the solvent in the film to 20% by weight based on the total amount of the film. Thereafter, the film was peeled off from the glass plate, dried at 80° C. for 60 minutes and at 120° C. for 60 minutes in a dryer, fixed by means of an iron frame and continuously treated at 150° C. for one hour, at 200° C. for one hour, at 300° C. for one hour and at 400° C. for one hour to obtain a uniform polyimide film. The resulting film was reddish brown and 50 μm in thickness.

An infrared absorption spectrum analysis of the polyimide film was made. There were found absorption bands specific to imide group at 1780 cm$^{-1}$ and 1720 cm$^{-1}$. Thus, it was confirmed that the imidation was completed.

With regard to the characteristics of the film, the temperature of 5 wt % weight reduction of the film by thermogravimetric analysis, glass transition temperature by thermal mechanical analysis (TMA) and tensile characteristics determined by a material testing machine were evaluated. Tensile characteristics were measured by cutting the resulting polyimide film into strips of 5 mm in width and making the measurement under such testing conditions that the distance between fasteners was 30 mm and the tensile rate was 5 mm/min. The measurement was made at 23° C. The results are shown in Table 5. The film was excellent in heat resistance and had good mechanical characteristics.

COMPARATIVE EXAMPLE 7

In a 300 ml four-necked separable flask, there was placed 0.02 (2.162 g) of purified p-phenylenediamine (abbreviated to PPD). To the flask was then added 50 g of distilled N,N-dimethylacetamide (abbreviated to DMAc). The mixture was stirred to dissolve it.

The temperature of the solution obtained was controlled to 5° C. by an external water bath, and in a nitrogen atmosphere, while stirring the solution, 0.02 mol (4.366 g) of purified anhydrous pyromellitic dianhydride (abbreviated to PMDA) in the form of a solid was gradually added thereto with care so that the temperature of the solution was not raised.

The resulting polymer solution was a viscous liquid and had an intrinsic viscosity of 1.6 dl/g at 30° C. The polymer solution was not gelled even when left to stand at room temperature for 5 hours.

In the same manner as in Example 16, a film was prepared from the polymer solution, dried and heat-treated. However, after the film was dried at 120° C. for 60 minutes, the resulting film was so brittle that it could not be fixed by means of an iron frame. Further, after the film with free ends was heat-treated at a high temperature under temperature conditions similar to those of Example 18, the resulting film was very brittle so that the evaluation of glass transition temperature by TMA and tensile characteristics by material testing machine could not be made.

EXAMPLE 19

In a 300 ml four-necked separable flask, there were placed 0.014 (1.513 g) of purified p-phenylenediamine (abbreviated to PPD), 0.0036 mol (0.7207 g) of 4,4'-diaminodiphenyl ether and 0.0012 mol (0.4752 g) of 3,3',4,4'-tetraaminobiphenyl tetrahydrochloride dihydrate (abbreviated to TABT). To the flask was then added 50 g of distilled N,N-dimethylacetamide (abbreviated to DMAc). The mixture was stirred to dissolve them.

The temperature of the solution obtained was controlled to 5° C. by an external water bath, and in a nitrogen atmosphere, while stirring the solution, 0.02 mol (4.366 g) of purified anhydrous pyromellitic dianhydride (abbreviated to PMDA) in the form of a solid was gradually added thereto with care so that the temperature of the solution was not raised.

Thereafter, the preparation of a polymer solution and a polyimide film was carried out in the same manner as in Example 18. The evaluation of various characteristics was made in the same manner as in Example 18. The results are shown in Table 5.

EXAMPLE 20

In a 300 ml four-necked separable flask, there were placed 0.0124 (1.340 g of purified p-phenylenediamine (abbreviated to PPD), and 0.0014 mol (0.5544 g) of 3,3',4,4'-tetraaminobiphenyl tetrahydrochloride dihydrate (abbreviated to TABT). To the flask was then added 30 g of distilled N,N-dimethylacetamide (abbreviated to DMAc). The mixture was stirred to dissolve them.

The temperature of the solution obtained was controlled to 5° C. by an external water bath, and in a nitrogen atmosphere, while stirring the solution, 0.0152 mol (3.318 g) of purified anhydrous pyromellitic dianhydride (abbreviated to PMDA) in the form of a solid was gradually added thereto with care so that the temperature of the solution was not raised.

In another 300 ml four-necked separable flask, there were placed 0.004 mol (0.4324 g of purified m-phenylenediamine (abbreviated to MPD) and 0.0006 mol (0.2376 g) of 3,3',4,4'-tetraaminobiphenyl tetrahydrochloride dihydrate (abbreviated to TABT). To the flask was then added 20 g of distilled N,N-dimethylacetamide (abbreviated to DMAc). The mixture was stirred to dissolve them.

Similarly, the temperature of the solution obtained was controlled to 5° C. by an external water bath, and in a nitrogen atmosphere, while stirring the solution, 0.0048 mol (1.048 g) of purified anhydrous pyromellitic dianhydride (abbreviated to PMDA) in the form of a solid was gradually added thereto with care so that the temperature of the solution was not raised.

While controlling the temperature to 5° C., the above two reaction mixtures (solutions) were mixed and the resulting mixture was stirred to obtain a uniform solution. The solution was cast on a glass sheet in an amount of 460 g/m$^2$ before gelation occurred. Thereafter, a polyimide film was prepared in the same manner as in Example 18. The evaluation of various characteristics was made. The results are shown in Table 5.

EXAMPLES 21 TO 25 AND COMPARATIVE EXAMPLES 8 to 12

Into a 500 ml four-necked separable flask, there were charged monomers and solvents indicated in Table 4 in amounts given in Table 4. In the same manner as in Example 18 or Comparative Example 7, polymer solutions and polyimide films were prepared and various characteristics were evaluated. The temperature of the final high-temperature treatment in the preparation of the polyimide films is shown in Table 4. In Examples 20 to 25, the gelation of the film of the polyamic acid was confirmed after the prepared polymer solution was cast on a glass plate and then left to stand for 40 minutes.

Physical properties of the films were measured and shown in Table 5. The chemical structural formulae of compounds used herein and molecular weights thereof which are not shown hereinbefore are shown in Table 6.

With regard to polyimide films after heat treatment, there was no great difference in thermal properties between the film of the Examples and those of the Comparative Examples. However, the mechanical characteristics, particularly tensile strength and elongation of the invention films were improved. This can be understood by comparing results of Example 22 and those of Comparative Example 11, and the results of Example 24 and Comparative Example 12.

TABLE 4

| | Example | | | | | | | | Comparative Example | | | | | |
|---|---|---|---|---|---|---|---|---|---|---|---|---|---|---|
| | 18 | 19 | 20 | 21 | 22 | 23 | 24 | 25 | 7 | 8 | 9 | 10 | 11 | 12 |
| Component A | | | | | | | | | | | | | | |
| PMDA | 100 | 100 | 100 | 100 | — | — | — | 50 | 100 | 100 | 100 | 100 | — | — |
| BTDA | — | — | — | — | 100 | 50 | — | — | — | — | — | — | 100 | — |
| DSTA | — | — | — | — | — | 50 | — | — | — | — | — | — | — | — |
| BPDA | — | — | — | — | — | — | 100 | 50 | — | — | — | — | — | 100 |
| Component B | | | | | | | | | | | | | | |
| PPD | 84 | 70 | 62 | 74 | — | — | 30 | 90 | 100 | 78 | 72 | 98 | — | 40 |
| MPD | — | — | 20 | — | — | — | — | — | — | — | 28 | — | — | — |
| 4,4'-DPE | — | 18 | — | — | 46 | — | — | — | — | 22 | — | — | 50 | — |
| BAPB | — | — | — | — | — | 42 | 50 | — | — | — | — | — | — | 60 |
| TPE-R | — | — | — | — | — | 50 | — | — | — | — | — | — | — | — |
| TPE-Q | — | — | — | — | 46 | — | — | — | — | — | — | — | 50 | — |
| Component C | | | | | | | | | | | | | | |
| TABT | 8 | 6 | 10 | 15 | — | — | — | 5 | — | — | — | 1 | — | — |
| TADET | — | — | — | — | 4 | — | — | — | — | — | — | — | — | — |
| TADMT | — | — | — | — | — | 4 | 8 | — | — | — | — | — | — | — |
| Conditions | | | | | | | | | | | | | | |
| Solvent | DMAc | DMAc | DMAc | DMF | DMSO | DMAc | DMAc | NMP | DMAc | DMAc | DMAc | DMF | DMSO | DMAc |
| Final Heat Treatment Temp. °C. | 400 | 400 | 400 | 400 | 350 | 350 | 400 | 400 | 400 | 400 | 400 | 400 | 350 | 400 |
| Concentration of Components (A), (B) and (C) (%) | 12.0 | 12.4 | 12.2 | 8.0 | 12.1 | 11.5 | 11.5 | 12.0 | 11.5 | 10.5 | 11.7 | 8.0 | 11.8 | 12.0 |

TABLE 5

| | Example | | | | | | | | Comparative Example | | | | | |
|---|---|---|---|---|---|---|---|---|---|---|---|---|---|---|
| | 18 | 19 | 20 | 21 | 22 | 23 | 24 | 25 | 7 | 8 | 9 | 10 | 11 | 12 |
| Physical Properties | | | | | | | | | | | | | | |
| State of Gelation | ○ | ○ | ○ | ○ | ○ | ○ | ○ | ○ | X | X | X | X | X | X |
| Temperature of 5 wt % weight reduction | 595 | 590 | 590 | 590 | 565 | 550 | 580 | 590 | 600 | 590 | 595 | 600 | 570 | 580 |
| Glass Transition Temp. °C. | 430 | 415 | 420 | 400 | 375 | 335 | 405 | 420 | — | — | — | — | 375 | 410 |
| Tensile Strength kgf/mm$^2$ | 13 | 18 | 15 | 10 | 14 | 15 | 20 | 15 | — | — | — | — | 13 | 20 |
| Modulus of Elasticity kgf/mm$^2$ | 500 | 450 | 475 | 440 | 330 | 320 | 395 | 450 | — | — | — | — | 330 | 390 |
| Elongation % | 5.0 | 10 | 7.5 | 3.0 | 32 | 28 | 15 | 10 | — | — | — | — | 20 | 10 |

Note:
The values in the Table represent molar ratios, and thus differ from the values with regard to moles used in the experiments of the Examples and Comparative Examples).
State of Gelation: The mark ○ means that a free-standing gel was formed.
The mark X means that gel was not formed or gel was imperfect.
Glass transition temperature was measured by thermal mechanical analysis (at a heating rate of 10° C./min under a load of 10 g.)
Solvent DMAc: N,N-dimethylacetamide
NMP: N-methyl-2-pyrrolidone
DMF: N,N-dimethylformamide
DMSO: dimethyl sulfoxide
When the concentration of components (A), (B) and (C) in Comparative Example 10 was increased to 12% a free-standing gel was formed.

TABLE 6

| Classification | Abbreviation | Name | Chemical structural formula | Mol. wt. |
|---|---|---|---|---|
| Aromatic diamine (Component B) | MPD | m-phenylenediamine | | 108 |
| | 4,4-DPE | 4,4'-diaminodiphenyl ether | | 200 |
| Tetraamine (Component C) | TABT | 3,3',4,4'-tetraamino-biphenyl tetrahydrochloride dihydrate | | 396 |
| | TADET | 3,3',4,4'-tetraamino-diphenyl ether tetrahydrochloride | | 376 |
| | TADMT | 3,3',4,4'-tetraamino-diphenylmethane tetrahydrochloride | | 365 |

While the invention has been described in detail and with reference to specific embodiments thereof, it will be apparent to one skilled in the art that various changes and modifications can be made therein without departing from the spirit and scope thereof.

What is claimed is:

1. A polyamic acid having a three-dimensional network molecular structure produced by a gel forming ring-opening polyaddition reaction in an organic solvent of the reaction components comprising:

(A) an acid component consisting of at least one tetracarboxylic acid dianhydride selected from the group consisting of a tetracarboxy benzene dianhydride, a tetracarboxy dianhydride of a compound having 2 to 5 condensed benzene rings, and compounds represented by formula (III), and substituted compounds thereof:

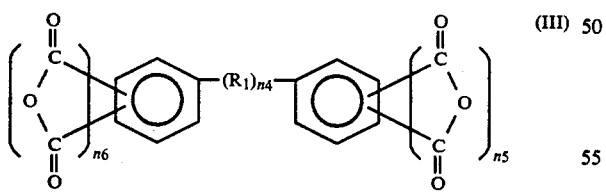
(III)

wherein $R_1$ represents —O—, —CO—, —SO$_2$—, —SO—, an alkylene group, an alkylene bicarbonyloxy group, an alkylene bioxycarbonyl group, a phenylene group, a phenylene alkylene group, or a phenylene dialkylene group, $n_4$ is 0 or 1; $n_5$ is 0 or 1; and $n_6$ is 1 or 2, provided that the sum of $n_5$ and $n_6$ is 2, and (2) 0 to 10 wt % of at least one acid component selected from the group consisting of a di- or tricarboxylic acid, a carboxylic acid anhydride and a substituted compound thereof;

(B) at least one aromatic diamine; and (C) at least one polyamino compound selected from the group consisting of compounds represented by formula (I) or (II):

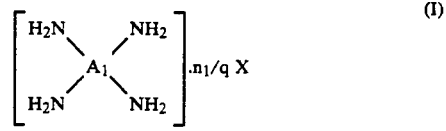
(I)

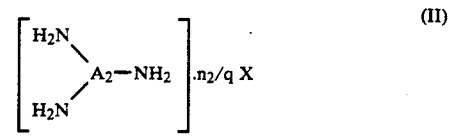
(II)

wherein $A_1$ represents

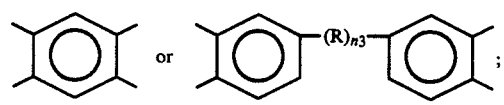

$A_2$ represents

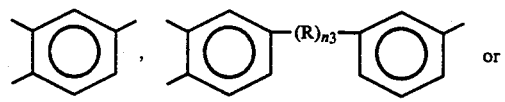, or

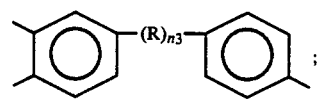;

$n_1$ is 0 or an integer from 1 to 4; $n_2$ is 0 or an integer from 1 to 3; X represents an acid; q represents the base number of the acid; R represents —O—, —CH$_2$—, —CO— or —SO$_2$—; and n$_3$ is 0 or 1.

2. The polyamic acid as claimed in claim 1, wherein said aromatic diamine is selected from the group consisting of a phenylene diamine, a diamino pyridine, a diamino compound having 2 to 8 condensed benzene rings, compounds represented by formula (IV) and substituted compounds thereof:

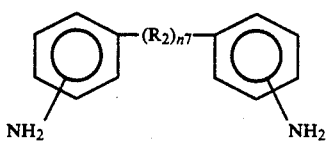 (IV)

wherein R$_2$ represents —O—, —CO—, —SO$_2$—, —SO—, a phenylene group, an alkylene group, a phenylene alkylene group, a phenylene dialkylene group, or

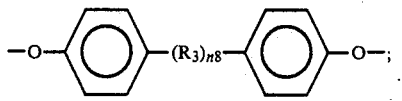

n$_7$ is 0 or 1; R$_3$ represents —O—, —CO—, —SO$_2$—, —SO—, a phenylene group, an alkylene group, or a phenylene alkylene group, or a phenylene dialkylene group; and n$_8$ is 0 or 1.

3. The polyamic acid as claimed in claim 1, wherein said polyamino compound comprises at least one addition salt of said compound represented by formula (I) or (II), selected from the group consisting of salts of p-toluenesulfuric acid, picric acid and hydrochloric acid.

4. The polyamic acid as claimed in claim 1, wherein in said polyamic acid the molar ratio of said tetracarboxylic acid dianhydride to said aromatic diamine to said polyamino compound is from 100:60-100:1-20.

5. The polyamic acid as claimed in claim 1, wherein in said polyamic acid the molar ratio of said tetracarboxylic acid dianhydride to said aromatic diamine to said polyamino compound is from 100:70-100:4-15.

6. The polyamic acid as claimed in claim 1, wherein said polyamic acid has a molecular weight of from 10,000 to 300,000.

7. The polyamic acid as claimed in claim 1, wherein said tetracarboxylic acid dianhydride is selected from pyromellitic dianhydride, benzophenonetetracarboxylic acid dianhydride, biphenyltetracarboxylic acid dianhydride and mixtures thereof.

8. The polyamic acid as claimed in claim 1, wherein said aromatic diamine is selected from p-phenylenediamine, m-phenylenediamine, 4,4-diaminodiphenyl ether, and mixtures thereof.

9. The polyamic acid as claimed in claim 1, wherein said polyamic acid is in the form of a free-standing gel.

10. The polyamic acid as claimed in claim 9, wherein said gel contains an organic solvent in an amount of from 50 to 97% by weight based on the total weight of the gel.

11. The polyamic acid as claimed in claim 9, wherein said free-standing gel is in the form of a film.

12. A process for making a polyamic acid having a three-dimensional network molecular structure comprising the steps of conducting a gel forming ring-opening polyaddition reaction in an organic solvent of the reaction components comprising (A) an acid component consisting of at least one tetracarboxylic acid dianhydride selected from the group consisting of a tetracarboxy benzene dianhydride, a tetracarboxy dianhydride of a compound having 2 to 5 condensed benzene rings, and compounds represented by formula (III), and substituted compounds thereof:

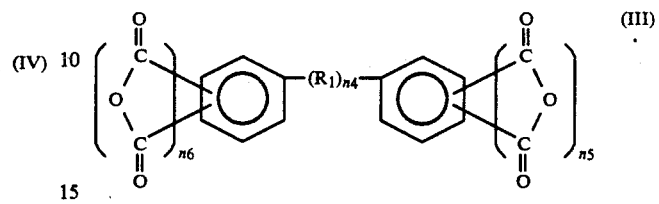

wherein R$_1$ represents —O—, —CO—, —SO$_2$—, —SO—, an alkylene group, an alkylene bicarbonyloxy group, an alkylene bioxycarbonyl group, a phenylene group, a phenylene alkylene group, or a phenylene dialkylene group, n$_4$ is 0 or 1; n$_5$ is 0 or 1; and n$_6$ is 1 or 2, provided that the sum of n$_5$ and n$_6$ is 2, and (2) 0 to 10 wt % of at least one acid component selected from the group consisting of a di- or tricarboxylic acid, a carboxylic acid anhydride and a substituted compound thereof;

(B) at least one aromatic diamine; and (C) at least one polyamino compound selected from the group consisting of compounds represented by formula (I) or (II) in an organic solvent for these reaction components;

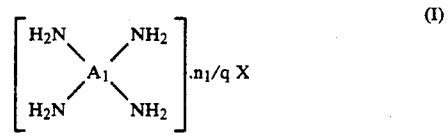

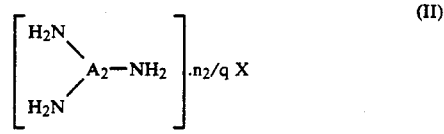

wherein A$_1$ represents

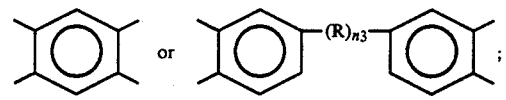

A$_2$ represents

 or

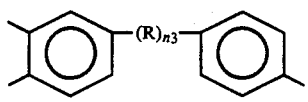 ;

n$_1$ is 0 or an integer from 1 to 4; n$_2$ is 0 or an integer from 1 to 3; X represents an acid; q represents the base number of the acid; R is —O—, —CH$_2$—, —CO—, or —SO$_2$—; and n$_3$ represents 0 or 1.

13. The process as in claim 12, wherein reaction is conducted at a temperature of $-10°$ to $80°$ C.

14. The process as claimed in claim 12, wherein said polyamic acid reaction product is in the form of a free-standing gel.

15. The process as claimed in claim 14, wherein said solvent is used in an amount of 50 to 97% by weight of the total weight of the polyamic acid to be produced and the solvent.

16. The process as claimed in claim 12, wherein the molar ratio of said tetracarboxylic acid dianhydride to said aromatic diamine to said polyamino compound is 100:60-100:1-20.

17. The process as claimed in claim 12, wherein the molar ratio of said tetracarboxylic acid dianhydride to said aromatic diamine to said polyamino compound is 100:70-100:4-15.

18. The process as claimed in claim 12, wherein the difference of the molar number of reactive acid groups of said tetracarboxylic acid dianhydride is within ±5% of the total molar number of reactive amine groups contained in said aromatic diamine and said polyamino compound.

19. The process as claimed in claim 12, comprising the further step of casting the solution formed in said step as a film on a support, wherein said reaction is completed on said support to provide a gel film of said polyamic acid three dimensional network molecular structure.

20. A process for producing a polyimide resin comprising the steps of:
(a) conducting a ring-opening polyaddition step of (A) an acid component consisting of at least one tetracarboxylic acid dianhydride selected from the group consisting of a tetracarboxy benzene dianhydride, a tetracarboxy dianhydride of a compound having 2 to 5 condensed benzene rings, and compounds represented by formula (III), and substituted compounds thereof:

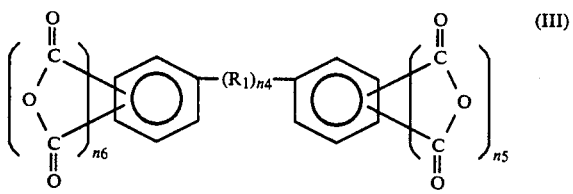

wherein $R_1$ represents —O—, —CO—, —SO$_2$—, —SO—, an alkylene group, an alkylene bicarbonyloxy group, an alkylene bioxycarbonyl group, a phenylene group, a phenylene alkylene group, or a phenylene dialkylene group, $n_4$ is 0 or 1; $n_5$ is 0 or 1; and $n_6$ is 1 or 2, provided that the sum of $n_5$ and $n_6$ is 2, and (2) 0 to 10 wt % of at least one acid component selected from the group consisting of a di- or tricarboxylic acid, a carboxylic acid anhydride and a substituted compound thereof, (B) at least one aromatic diamine and (C) at least one polyamino compound selected from the group consisting of compounds represented by formula (I) or (II) in an organic solvent for reaction components (A), (B), and (C) until a gel of a polyamic acid having a three-dimensional network molecular structure is formed;

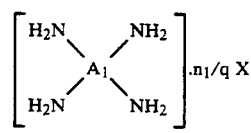

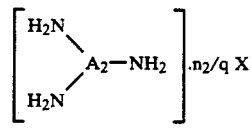

wherein $A_1$ represents

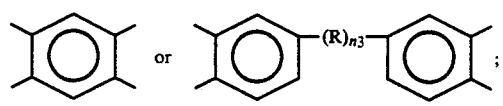

$A_2$ represents

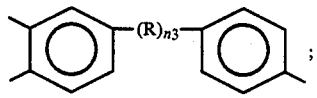

$n_1$ is 0 or an integer from 1 to 4; $n_2$ is 0 or an integer from 1 to 3; X represents an acid; q represents the base number of the acid; R is —O—, —CH$_2$—, —CO—, or —SO$_2$—; and $n_3$ represents 0 or 1; and (b) dehydrating and cyclizing said polyamic acid to produce a polyimide resin.

21. The process as claimed in claim 20, wherein said dehydrating and cyclizing step is conducted after drying the reaction product to remove the solvent and then heating the polyamic acid.

22. The process as claimed in claim 20, wherein said dehydrating and cyclizing step is conducted after drying the reaction product to remove the solvent and then heating the polyamic acid at a temperature of not higher than 500° C.

23. The process as claimed in claim 20, wherein said dehydrating and cyclizing step is conducted by heating said polyamic acid in a form of a gel.

24. The process as claimed in claim 23, wherein said polyamic acid gel contains 50 to 97% by weight of said organic solvent.

25. The process as claimed in claim 20, wherein said dehydrating and cyclizing step is conducted by contacting said polyamic acid with a solution of dehydrating agent.

26. The process as claimed in claim 20, wherein said dehydrating and cyclizing step comprises the steps of removing at least a portion of said organic solvent from said polyamic acid and subsequently contacting said polyamic acid with a solution of dehydrating agent.

27. The process as claimed in claim 26, wherein said dehydrating agent is an acid anhydride and said dehydrating and cyclizing reaction is conducted in the presence of an amine as a catalyst.

28. The process as claimed in claim 20, comprising the further step of casting the solution formed in step (a) as a film on a support, wherein said reaction in step (a) is completed on said support to provide a gel film of said polyamic acid three dimensional network molecular structure.

29. The process as claimed in claim 28, comprising the additional steps of:
(c) removing said organic solvent from said gel film at a temperature of at most 100° C. to reduce the solvent content of said gel film to at most 50% by weight; and
(d) dehydrating and cyclizing said polyamic acid gel film to provide a polyimide film.

30. The process as claimed in claim 29, wherein in step (c) the solvent content of said polyamic acid film is reduced to 0 to 10% by weight, and said dehydrating and cyclizing step (d) is performed by heating said polyamic acid gel film at a temperature of up to 500° C. for a time sufficient substantially to convert said polyamic acid gel to a polyimide.

31. The process as claimed in claim 30, wherein said step (c) and said step (d) are conducted under tension sufficient to avoid reduction of the surface area of said polyamic acid gel film.

32. A polyamic acid reduced by dehydrating and cyclizing a polyamic acid having a three-dimensional network molecular structure, said polyamic acid being produced by ring-opening polyaddition reaction in an organic solvent of the reaction components comprising:
(A) an acid component consisting of at least one tetracarboxylic acid dianhydride selected from the group consisting of a tetracarboxy benzene dianhydride, a tetracarboxy dianhydride of a compound having 2 to 5 condensed benzene rings, and compounds represented by formula (III), and substituted compounds thereof:

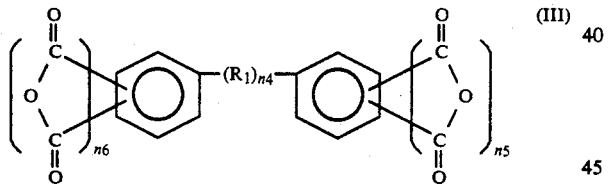

wherein $R_1$ represents —O—, —CO—, —SO$_2$—, —SO—, an alkylene group, an alkylene bicarbonyloxy group, an alkylene bioxycarbonyl group, a phenylene group, a phenylene alkylene group, or a phenylene dialkylene group, $n_4$ is 0 or 1; $n_5$ is 0 or 1; and $n_6$ is 1 or 2, provided that the sum of $n_5$ and $n_6$ is 2, and (2) 0 to 10 wt % of at least one acid component selected from the group consisting of a di- or tricarboxylic acid, a carboxylic acid anhydride and a substituted compound thereof;
(B) at least one aromatic diamine; and
(C) at least one polyamino compound selected from the group consisting of compounds represented by formula (I) or (II):

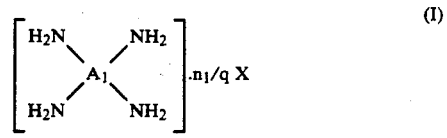

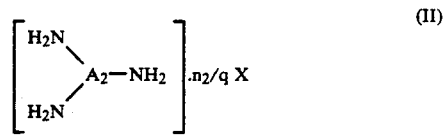

wherein $A_1$ represents

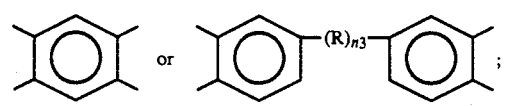

$A_2$ represents

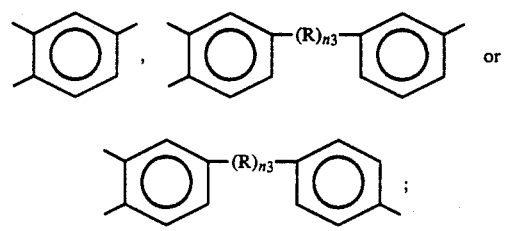

$n_1$ is 0 or an integer from 1 to 4; $n_2$ is 0 or an integer from 1 to 3; X represents an acid; q represents the base number of the acid; R represents —O—, —CH$_2$—, —CO— or —SO$_2$—; and $n_3$ is 0 or 1.

33. The polyimide resin as claimed in claim 31, wherein said polyimde resin is in the form of a film.

34. The polyamic acid as in claim 1, wherein the equivalent ratio of the tetracarboxylic acid dianhydride to the eqivalent of amine is within the range of from 0.95 to 1.05.

35. The process as claimed in claim 12, wherein the total concentration of the tetracarboxylic acid dianhydride, the aromatic diamine and polyamino compound in the organic solvent is from 5 to 30% by weight.

* * * * *